US009904717B2

(12) United States Patent
Anglin et al.

(10) Patent No.: US 9,904,717 B2
(45) Date of Patent: *Feb. 27, 2018

(54) REPLICATION OF DATA OBJECTS FROM A SOURCE SERVER TO A TARGET SERVER

(75) Inventors: Matthew J. Anglin, Tucson, AZ (US);
David M. Cannon, Tucson, AZ (US);
Colin S. Dawson, Tucson, AZ (US);
Barry Fruchtman, Tucson, AZ (US);
Mark A. Haye, Tucson, AZ (US);
Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,136

(22) Filed: Apr. 25, 2012

(65) Prior Publication Data

US 2013/0054524 A1    Feb. 28, 2013

Related U.S. Application Data

(63) Continuation of application No. 13/221,670, filed on Aug. 30, 2011.

(51) Int. Cl.
*G06F 17/30* (2006.01)

(52) U.S. Cl.
CPC .. *G06F 17/30575* (2013.01); *G06F 17/30867* (2013.01)

(58) Field of Classification Search
CPC ......... G06F 17/30067; G06F 17/30097; G06F 17/30575; G06F 17/30345; G06F 21/6218;

(Continued)

(56) References Cited

U.S. PATENT DOCUMENTS

| 5,170,480 A | 12/1992 | Mohan et al. |
| 6,345,308 B1 * | 2/2002 | Abe ......................... H04L 29/06 707/999.101 |

(Continued)

FOREIGN PATENT DOCUMENTS

| CA | 2741477 | 4/2010 |
| CN | 525337 | 9/2004 |

(Continued)

OTHER PUBLICATIONS

U.S. Patent Application entitled, "Applying Replication Rules to Determine Whether to Replicate Objects", filed Aug. 30, 2011, by inventors M. Anglin, D. Cannon, C. Dawson, and H. Martin.

(Continued)

*Primary Examiner* — Kris Mackes
*Assistant Examiner* — Merilyn Nguyen
(74) *Attorney, Agent, or Firm* — David W. Victor; Konrad, Raynes, Davda & Victor LLP

(57) ABSTRACT

Data objects are replicated from a source storage managed by a source server to a target storage managed by a target server. A source list is built of objects at the source server to replicate to the target server. The target server is queried to obtain a target list of objects at the target server. A replication list is built indicating objects on the source list not included on the target list to transfer to the target server. For each object in the replication list, data for the object not already at the target storage is sent to the target server and metadata on the object is sent to the target server to cause the target server to include the metadata in an entry for the object in a target server replication database. An entry for the object is added to a source server replication database.

14 Claims, 9 Drawing Sheets

(58) Field of Classification Search
CPC ......... G06F 17/30174; G06F 17/30368; G06F 17/30607; G06F 11/2094; G06F 17/30867
USPC ..................................................... 707/624
See application file for complete search history.

(56) References Cited

U.S. PATENT DOCUMENTS

| | | | |
|---|---|---|---|
| 6,463,454 B1* | 10/2002 | Lumelsky et al. ............ | 718/105 |
| 6,978,282 B1 | 12/2005 | Dings et al. | |
| 7,076,620 B2 | 7/2006 | Takeda et al. | |
| 7,203,712 B2* | 4/2007 | Adiba ............... | G06F 17/30318 |
| 7,246,258 B2 | 7/2007 | Chen et al. | |
| 7,320,059 B1* | 1/2008 | Armangau ........ | G06F 17/30085 |
| | | | 711/100 |
| 7,350,041 B1* | 3/2008 | Armangau ............ | G06F 3/0605 |
| | | | 711/108 |
| 7,418,565 B2 | 8/2008 | Takeda et al. | |
| 7,519,785 B1* | 4/2009 | Schultz et al. ................ | 711/162 |
| 7,636,704 B2 | 12/2009 | Armangau et al. | |
| 7,769,722 B1* | 8/2010 | Bergant ............ | G06F 17/30212 |
| | | | 707/681 |
| 7,979,546 B2 | 7/2011 | Hamel et al. | |
| 8,379,645 B2 | 2/2013 | Dai et al. | |
| 8,671,072 B1* | 3/2014 | Shah ...................... | G06F 3/0619 |
| | | | 707/610 |
| 8,743,881 B2 | 6/2014 | Dai et al. | |
| 8,799,222 B2* | 8/2014 | Marathe ............ | G06F 17/30997 |
| | | | 707/639 |
| 8,838,529 B2 | 9/2014 | Anglin et al. | |
| 8,918,362 B2* | 12/2014 | Calder .............. | G06F 17/30575 |
| | | | 707/610 |
| 8,972,343 B2 | 3/2015 | Hironaga et al. | |
| 2003/0204557 A1 | 10/2003 | Mandal et al. | |
| 2004/0153473 A1 | 8/2004 | Hutchinson et al. | |
| 2004/0172509 A1 | 9/2004 | Takeda et al. | |
| 2005/0027748 A1 | 2/2005 | Kisley | |
| 2005/0273654 A1 | 12/2005 | Chen et al. | |
| 2006/0053181 A1* | 3/2006 | Anand ................ | G06F 11/0715 |
| 2006/0161449 A1 | 7/2006 | McKinney | |
| 2006/0174076 A1 | 8/2006 | Takeda et al. | |
| 2007/0050415 A1* | 3/2007 | Armangau et al. ........... | 707/200 |
| 2007/0055835 A1 | 3/2007 | Malkin et al. | |
| 2008/0250086 A1 | 10/2008 | Kisley | |
| 2008/0282048 A1 | 11/2008 | Miura | |
| 2009/0063587 A1* | 3/2009 | Jakob .................. | G06F 11/2094 |
| 2009/0119346 A1 | 5/2009 | Lu et al. | |
| 2010/0063951 A1 | 3/2010 | Nagoya et al. | |
| 2010/0114817 A1* | 5/2010 | Broeder et al. ............... | 707/612 |
| 2010/0131480 A1 | 5/2010 | Schneider | |
| 2010/0142547 A1 | 6/2010 | Dai et al. | |
| 2010/0161551 A1* | 6/2010 | Whynot ........................ | 707/610 |
| 2011/0078110 A1* | 3/2011 | Joseph .............. | G06F 17/30174 |
| | | | 707/610 |
| 2011/0196830 A1* | 8/2011 | Zunger .............. | G06F 17/30215 |
| | | | 707/624 |
| 2011/0196831 A1* | 8/2011 | Zunger .............. | G06F 17/30215 |
| | | | 707/634 |
| 2011/0213781 A1* | 9/2011 | Hansel .............. | G06F 17/30578 |
| | | | 707/741 |
| 2011/0313971 A1 | 12/2011 | Hironaga et al. | |
| 2012/0233418 A1* | 9/2012 | Barton .............. | G06F 17/30575 |
| | | | 711/162 |
| 2013/0024429 A1 | 1/2013 | Raas | |
| 2013/0054523 A1 | 2/2013 | Anglin et al. | |
| 2013/0128775 A1 | 5/2013 | Dai et al. | |

FOREIGN PATENT DOCUMENTS

| | | |
|---|---|---|
| CN | 101101563 | 1/2008 |
| CN | 101414949 | 4/2009 |
| CN | 102063500 | 5/2011 |
| EP | 1933236 | 6/2008 |
| JP | 11249874 | 9/1999 |
| JP | 2003087491 | 3/2003 |
| JP | 2005267157 | 9/2005 |
| JP | 2005317017 | 11/2005 |
| JP | 2008146577 | 6/2008 |
| JP | 2009146425 | 7/2009 |
| WO | 2010097849 | 9/2010 |

OTHER PUBLICATIONS

P. Mell, "THe NIST Definition of Cloud Computing (Draft)", National Institute of Standards and Technology, Special Publication 800-145 (draft), Jan. 2011, pp. 1-7.
U.S. Appl. No. 13/221,670, filed Aug. 30, 2011, entitled, "Replication of Data Objects From a Source Server to a Target Server", invented by Matthew J. Anglin et al., 1-46 pp.
Preliminary Amendment dated Apr. 25, 2012, pp. 1-11, for U.S. Appl. No. 13/221,670, filed Aug. 30, 2011 by inventors Matthew J. Anglin et al.
Written Opinion of the International Searching Authority, dated Dec. 18, 2012, for International Application No. PCT/CA2012/050593, filed Aug. 28, 2012, pp. 1-4.
International Search Report, dated Dec. 18, 2012, for International Application No. PCT/CA2012/050593, filed Aug. 28, 2012, pp. 1-4.
Preliminary Amendment, dated Apr. 25, 2012 for U.S. Appl. No. 13/221,670, filed Aug. 30, 2011, entitled, "Replication of Data Objects From a Source Server to a Target Server", invented by Matthew J. Anglin et al., pp. 1-11.
Office Action, dated Nov. 12, 2013, for U.S. Appl. No. 13/221,670, filed Aug. 30, 2011, entitled, "Replication of Data Objects From a Source Server to a Target Server", invented by Matthew J. Anglin et al., pp. 1-29.
Information Materials for IDS, dated Jul. 31, 2014, Total 2 pages.
Response to Foinal Office Action, dated Sep. 5, 2014, for U.S. Appl. No. 13/221,670 (37.273), filed Aug. 30, 2011, invented by Matthew J. Anglin et al., Total 16 pages.
US20110313971 is an English language counterpart of WO2010097849.
US20080282048 is an English language counterpart of JP2008146577.
Machine Translation for WO2010097849, published Sep. 2, 2010, Total 22 pages.
Machine Translation for JP2008146577, published Jun. 26, 2008 Total 26 pages.
Office Action, dated Nov. 20, 2014, for U.S. Appl. No. 13/221,670 (37.273), filed Aug. 30, 2011, invented by Matthew J. Anglin et al., Total 15 pages.
Response to Office Action, dated Feb. 20, 2015, for U.S. Appl. No. 13/221,670 (37.273), filed Aug. 30, 2011, invented by Matthew J. Anglin et al., Total 16 pages.
Information Materials for IDS, dated Dec. 16, 2014, Total 1 page.
Information Materials for IDS, dated Jul. 21, 2015, Total 2 pages.
U.S. Pat. No. 6,345,308 is an English counterpart to JP11249874.
U.S. Pat. No. 7,246,258 is an English counterpart to JP2005317017.
U.S. Pat. No. 8,972,343 is an English counterpart to WO2010097849.
Publication 2005273654 is an English Counterpart to JP2005317017.
Machine Translation for JP,2003-087491, published Mar. 20, 2003, Total 32 pages.
Machine Translation for JP2005267157, published Sep. 29, 2005, Total 36 pages.
Machine Translation for JP,2005-317017, published Nov. 10, 2005, Total 51 pages.
Machine Translation for JP,2008-146577, published Jun. 26, 2008, Total 77 pages.
Machine Translation for JP2009-146425, published Jul. 2, 2009, Total 55 pages.
US Patent Application, dated Jul. 31, 2014, for U.S. Appl. No. 14/448,953 (37.332), filed Jul. 31, 2014, invented by Matthew J. Anglin, Total 32 pages.
"Recovery Points on Source and Target Are Not the Same (146327)" dated May 15, 2015, (online), retrieved from the Internet at URL>https://support.software.dell.com/appassure/kb/146327, Total 1 page.

(56) References Cited

OTHER PUBLICATIONS

Final Office Action, dated Jun. 23, 2015, U.S. Appl. No. 13/221,670 (37.273), filed Aug. 30, 2011, invented by Matthew J. Anglin et al., Total 23 pages.
Response to Final Office Action, dated Sep. 22, 2015, for U.S. Appl. No. 13/221,670 (37.273), filed Aug. 30, 2011, invented by Matthew J. Anglin et al., Total 17 pages.
Office Action dated Dec. 21, 2015, pp. 24, for U.S. Appl. No. 13/221,670, filed Aug. 30, 2011, (37.273).
Response dated Mar. 21, 2016, pp. 17, to Office Action dated Dec. 21, 2015, pp. 24, for U.S. Appl. No. 13/221,670, filed Aug. 30, 2011, (37.273).
Machine Translation for CN101101563, published Sep. 1, 2008, Total 14 pages.
U.S. Pat. No. 7,076,620 is an English counterpart to CN1525337.
U.S. Pat. No. 7,418,565 is an English counterpart to CN1525337.
US Publication 2006/174076 is an English counterpart to CN1525337.
US Publication 2004/172509 is an English counterpart to CN1525337.
Final Office Action, dated Jul. 11, 2016, for U.S. Appl. No. 13/221,670 (37.273), filed Aug. 30, 2011, invented by Matthew J. Anglin et al., Total 27 pages.
Response to Final Office Action, dated Oct. 11, 2016, for U.S. Appl. No. 13/221,670 (37.273), filed Aug. 30, 2011, invented by Matthew J. Anglin et al., Total 18 pages.
Notice of Allowance, dated Mar. 14, 2017, for U.S. Appl. No. 13/221,670 (37.273), filed Aug. 30, 2011, invented by Matthew J. Anglin et al., Total 9 pages.
Patent 8379645 is an English Translation for CN101414949.
Patent 8743881 is an English Translation for CN101414949.
Publication 20100142547 is an English Translation for CN101414949.
Publication 20130128775 is an English Translation for CN101414949.
Machine Translation for CN102063500, published May 18, 2011, Total 9 pages.
Information Materials for IDS, dated Feb. 17, 2016, Total 4 pages.
Chinese Office Action, dated Sep. 10, 2016, Total 2 pages.
Search Report, dated Sep. 20, 2016, Total 2 pages.
Machine Translation for CN1525337, published Sep. 1, 2004, Total 27 pages.
Machine Translation for CN101101563, published Jan. 9, 2008, Total 14 pages.
Machine Translation for Chinese Office Action, Publication No. 201280041913.7, Translated on Sep. 20, 2016, Total 5 pages.

\* cited by examiner

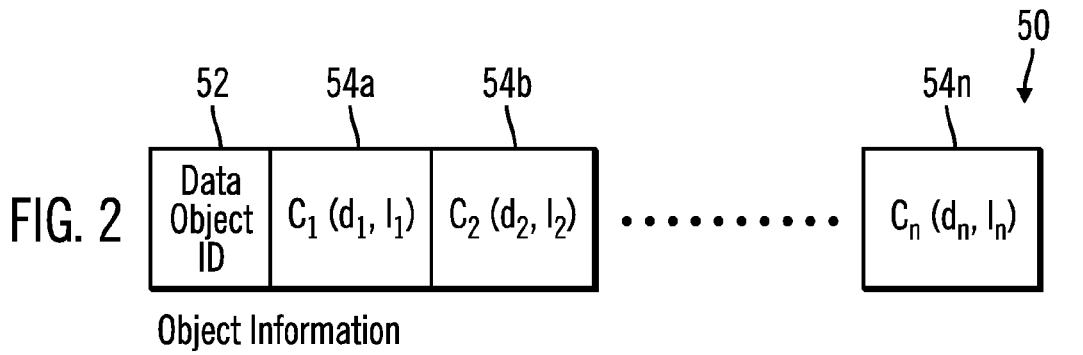
FIG. 2 Object Information
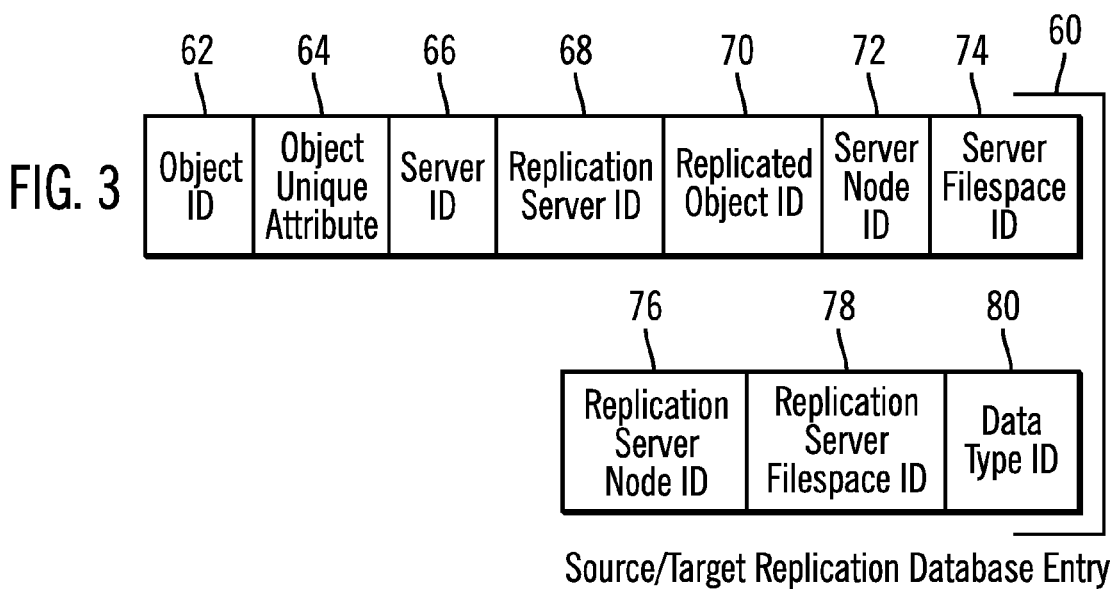
FIG. 3 Source/Target Replication Database Entry
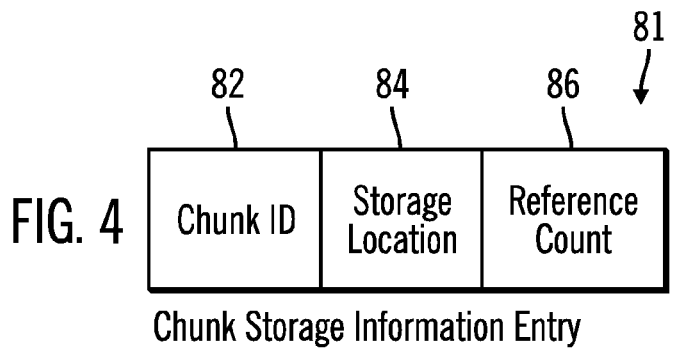
FIG. 4 Chunk Storage Information Entry
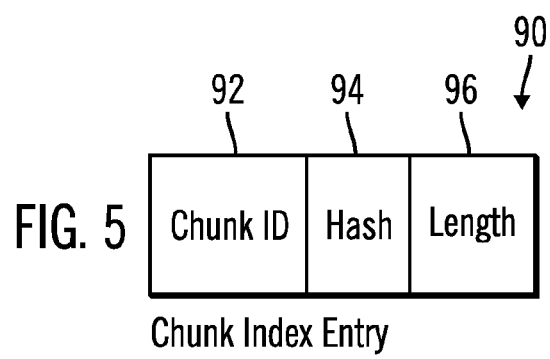
FIG. 5 Chunk Index Entry

REPLICATION OF DATA OBJECTS FROM A SOURCE SERVER TO A TARGET SERVER

CROSS-REFERENCE TO RELATED APPLICATION

This application is a continuation of U.S. patent application Ser. No. 13/221,670, filed Aug. 30, 2011, which application is incorporated herein by reference in its entirety.

BACKGROUND OF THE INVENTION

1. Field of the Invention

The present invention relates to a computer program product, system, and method for replication of data objects from a source server to a target server.

2. Description of the Related Art

Data replication is used to replicate data belonging to multiple nodes from one server to another server, so that if the main source server to which data is being backed-up goes down, the clients can recover their data from the replication site. A storage-management server such as Tivoli® Storage Manager (TSM) stores data objects in one or more storage pools and uses a database for tracking metadata about the stored objects. (Tivoli is a trademark of International Business Machines Corporation worldwide). The storage management server may replicate the data objects to a remote location for disaster recovery purposes. Some of the methods used to transfer data to a remote location include physically transporting tapes containing copies of the data from the source site to the disaster recovery site, electronically transmitting the data (TSM export/import) or using hardware replication of the source site disk storage to create a mirror of the data. Available replication hardware devices include Virtual Tape Library (VTL) products that perform block-level replication using deduplication hardware.

Data deduplication is a data compression technique for eliminating redundant data to improve storage utilization. Deduplication reduces the required storage capacity because only one copy of a unique data unit, also known as a chunk or extent, is stored. Disk based storage systems, such as a storage management server and Virtual Tape Library (VTL), may implement deduplication technology to detect redundant data chunks, and reduce duplication by avoiding redundant storage of such chunks.

A deduplication system operates by dividing a file into a series of chunks, or extents. The deduplication system determines whether any of the chunks are already stored, and then proceeds to only store those non-redundant chunks. Redundancy may be checked with chunks in the file being stored or chunks already stored in the system.

There is a need in the art for improved techniques for replicating objects from one server to another.

SUMMARY

Provided are a computer program product, system, and method for replication of data objects from a source storage managed by a source server to a target storage managed by a target server. A source list is built of objects at the source server to replicate to the target server. The target server is queried to obtain a target list of objects at the target server. A replication list is built indicating objects on the source list not included on the target list to transfer to the target server. For each object in the replication list, data for the object not already at the target storage is sent to the target server and metadata on the object is sent to the target server to cause the target server to include the metadata in an entry for the object in a target server replication database. An entry for the object is added to a source server replication database.

In a further embodiment, a query is received from the source server for a target list of objects at the target server. The target list of the objects at the target server are sent to the source server. Data for objects to store in the target storage is received from the source server. Metadata for the data received for the objects to replicate is received from the source server. An entry is added to a target server replication database for each object for which data is received including the metadata received for the object.

BRIEF DESCRIPTION OF THE DRAWINGS

FIG. 2 illustrates an embodiment of object information.

FIG. 3 illustrates an embodiment of a source and target replication database entry.

FIG. 4 illustrates an embodiment of a chunk storage information entry.

FIG. 5 illustrates an embodiment of a chunk index entry.

DETAILED DESCRIPTION

Described embodiments replicate data objects from a source server to a target server in a manner that more optimally utilizes transmission bandwidth by avoiding the transmission of data that is already available in the target server. The source server further sends metadata on objects having data or chunks already available at the target server to cause the target server to add an entry to a replication database for objects already at the target server and to ensure consistency of data and metadata. The described embodiments allow the user to provide replication criteria to allow selection and filtering of objects to replicate at an object level. Further embodiments also employ deduplication to avoid sending over chunks of objects being replicated that are already stored on the target server.

Figure 1:
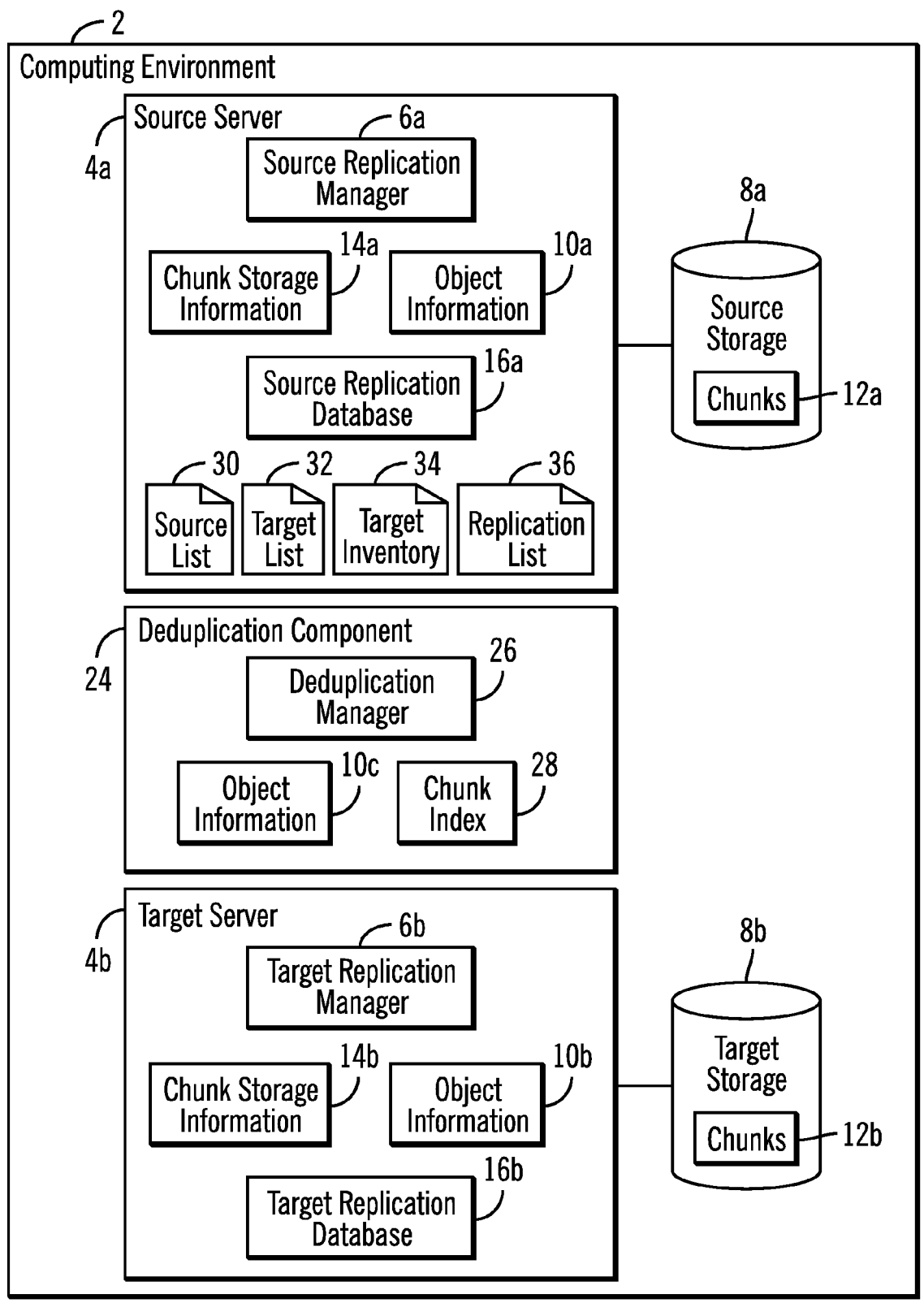
FIG. 1 illustrates a computing environment in which embodiments are implemented.

FIG. 1 illustrates an embodiment of a computing environment 2 having a source server 4a and target server 4b including a source replication manager 6a and target replication manager 6b, respectively, to replicate the data for objects at a source storage 8a to a target storage 8b. Either server 4a, 4b device may function as the source and target server. The replication may be performed on behalf of a client node connected to the source server 4a to replicate objects owned by the client node. The source server 4a and target server 4b maintain data objects as defined in the object information 10a and 10b, respectively. The data for the data objects, which may be in the form of separate units of data referred to as chunks 12a, 12b, are maintained in the source storage 8a and target storage 8b, respectively. Each server 4a, 4b maintains chunk storage information 14a, 14b indicating locations in the storage 8a, 8b where chunks of the data objects defined in the object information 10a, 10b are located. The object information 10a, 10b includes metadata or entries for each defined data object, comprised of an ordered list of chunks 12a, 12b of data assigned to each object.

The source server 4a and target server 4b maintain a source replication database 16a and target replication database 16b, respectively, having information on data objects at the source server 4a replicated to the target server 4b on behalf of a client node. The source server 4a further maintains and uses a source list 30 having objects on the source server 4a to replicate satisfying a replication criteria, such as owning client node, filespace at the client node, and data type; a target list 32 having objects on the target server 4b satisfying the replication criteria; a target inventory 34 of objects in the target server 4b, including a unique identifier or attribute to uniquely identify the objects; and a replication list 36 of files on the source list 30 not on the target list 32 to replicate to the target server 4b. The criteria used to build the target inventory 34 may be broader or the same as the replication criteria.

A deduplication component 24 provides deduplication services for the source 4a and target 4b servers to ensure that when the source server 4a or the target server 4b sends object data that duplicate chunks already present in the receiving server 4a, 4b are not resent. The deduplication component 24 includes a deduplication manager 26 to perform deduplication operations and a chunk index 28, such as a deduplication index, providing information on chunks 12a, 12b that have been assigned to objects. The deduplication manager 26 ensures that only one copy of each chunk is maintained in the source 8a and target 8b storages when data objects are transferred between the source 4a and target 4b servers, although one chunk in one storage 8a, 8b may be included in multiple data objects defined for the server 4a, 4b managing that storage. The deduplication manager 26 may also maintain object information 10c, having information on the assignment of chunks to objects in the source 4a and target 4b servers.

To perform deduplication, upon having a new or unchanged chunk in a data object, the source replication manager 6a or other component may obtain a hash for the chunk from a database, such as the chunk storage information 14a, 4b. In an alternative embodiment, the source replication manager 6a may calculate the hash. The source replication manager 6a communicates the accessed hash for the chunk to the deduplication manager 26 to determine whether the chunk index 28 has a matching hash. If not, the deduplication manager 26 notifies the source replication manager 6a that the chunk is new, and the source replication manager 6a sends a full copy of the new or changed chunk in a data object to the target server 4b to store in the target storage 8b. Otherwise, if the chunk index 28 has a matching copy of the hash, then the source replication manager 6a need not transfer a full copy of the chunk. Instead, the source replication manager 6a may transfer the digest for the chunk and its location in the object. Alternatively, the source replication manager 6a may interact with the deduplication component 24 to determine whether it needs to send a chunk to the target server 4b.

In a source-side deduplication embodiment, the source replication manager 6a communicates with the deduplication manager 26 to determine whether chunks need to be sent to the target server 4b, so that only new chunks not already indicated in the chunk index 28 as in the target storage 8b are sent to the target server 4b. In a target-side deduplication embodiment, the source server 4a sends all the chunks of a data object to replicate to the target server 4b, and the target replication manager 6b requests the deduplication component 24 to determine which chunks are new chunks that need to be stored in the target storage 8a.

The source server 4a, target server 4b and deduplication component 24 may be implemented in separate computer devices that communicate over a network, such as a local area network (LAN), storage area network (SAN), wide area network (WAN), etc. In further embodiments, the source server 4a, target 4b, and/or deduplication components 24 may be implemented on one or two computer systems. If the source server 4a, target server 4b, and/or deduplication component 24 are in the same system, then they may communicate over a bus or via memory.

The source 8a and target 8b storages may be configured in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

The source replication manager 6a, target replication manager 6b, and deduplication manager 26 may comprise software programs in a memory executed by a processor. In an alternative embodiment, some portion or all of the programs 6a, 6b, and 26 may be implemented in a hardware component, such as a dedicated integrated circuit, e.g., Application Specific Integrated Circuit (ASIC), expansion card, etc.

Although the source replication manager 6a, target replication manager 6b, and deduplication manager 26 are shown as separate components, in alternative implementations the functions performed by these components 6a, 6b, and 26 may be implemented in a single program component in a single computer system or in more than two program components in more than two computer devices. For instance, the deduplication component 24 may be implemented separately at the source server 4a and the target server 4b, or part of the source replication manager 6a or target replication manager 6b components. In embodiments where the deduplication component 24 is separately implemented in each server 4a, 4b, each server 4a, 4b may have its own deduplication component 24 and maintain object information 10c and chunk index 28.

The source 6a and target 6b replication managers may be used by client nodes to recover objects as part of a restore operation.

FIG. 2 illustrates an embodiment of object information 50 for one object maintained in the object information 10a, 10b, 10c. The object information 50 for one object includes an identifier (ID) 52 of the object, and identification information for one or more chunks 54a, 54b . . . 54n of data assigned to the object 52. The object information 50 may maintain an ordered list of the references to chunks ($C_1$ . . . $C_n$) indicating the order 1 . . . n in which the chunks appear in the data object. For each chunk ($C_i$), the object information 54i maintains a digest ($d_i$) of the chunk and a length ($l_i$) of the chunk. In this way, the object information 50 provides a reference to the chunks included in the data object, such as digest and length, but not the actual data. The digest (d) may be calculated by processing the chunk to generate a unique value for the chunk. For instance, in one embodiment, the digest may comprise a cryptographic digest, such as MD5 (Message-Digest Algorithm 5) or SHA-1 (Secure Hash Algorithm 1), which calculates cryptographic hashes of each chunk in the data object.

FIG. 3 illustrates an embodiment of an entry 60 in the source 16a and target 16b replication databases for each object being replicated from the source server 4a to the target server 4b. The entry 60 includes an object identifier (ID) 62; an object unique attribute 64 providing a unique identifier of the object, such as a signature, hash value or unique naming convention; a server identifier (ID) 66 comprising an identifier of the server 4a, 4b maintaining the object 62; a replication server ID 68 identifying the other server 4a, 4b in the replication relationship (for instance, an entry 60 in the source replication database 16a has the identifier of the target server 4b for field 68 and an entry 60 in the target replication database 16b has the identifier of the source server 4a for field 68); a replicated object ID 70 identifying the identifier assigned to the object in the replication server 68; a server node identifier (ID) 72 providing the source server 4a identifier of the client node owning the object 60; a source server 4a identifier of the filespace ID 74 identifying the filespace including the object 60; a replication server node ID 76 comprising the identifier the target server 4b, i.e., replication server, assigns to the client node owning the object 60; a replication server filespace ID 78 comprising an identifier the target server 4b (replication server) assigns to the filespace including the object 60; and a data type ID 80 identifying a data type of the object 60.

Thus, in certain embodiments, each server 4a, 4b assigns its own ID for the node 72 and 76 and filespace 74 and 78, respectively.

FIG. 4 illustrates an embodiment of a chunk storage information entry 81 the source server 4a and target server 4b maintain in their respective chunk storage information 14a, 14b for each chunk 12a, 12b maintained in the respective storage 8a, 8b they manage. The chunk storage entry information 81 includes a chunk ID 82; a storage location 84 in the storage 8a, 8b of the identified chunk 82, such as a logical or physical address, identifying where the chunk is stored in the storage 8a, 8b; and a reference count 86 indicating the number of objects at the source 4a or target 4b server referencing the chunk. A dereferenced chunk 12a, 12b not referenced in any object has a reference count 86 of zero and may be eligible for deletion if space is needed in the storage 8a, 8b.

FIG. 5 illustrates an embodiment of a deduplication index entry 90 maintained by the deduplication manager 26 in the chunk index 28 for each chunk 12a, 12b stored in the storages 8a, 8b. The index entry 90 includes a chunk identifier (ID) 92 of the chunk in storage 8a, 8b, a hash value 94 computed from the chunk represented by the chunk ID 92, and a length 96 of the chunk. When determining whether to transmit a copy of the chunk 12a to the target server 4b, the source replication manager 14a may provide the hash and length of the chunk to the deduplication component 24, and the deduplication manager 26 may determine whether one entry 90 in the chunk index 28 has a hash value 94 and length 96 matching those values for the chunk 12a being sent by the source replication manager 6a to determine whether the source replication manager 6a needs to transmit the chunk 12a or just an identifier of the chunk 12a, e.g., the digest and length. The chunk index entry 90 may further include additional information to manage the chunks 12a, 12b in the storages 8a, 8b.

In this way, the subcomponents of a data object, referred to herein as chunks, are stored separately from the objects in which they are included. A chunk 12a, 12b may comprise an extent of tracks, a block of data or any other definable subunit of data that may be assigned to an object. These chunks 12a, 12b may have fixed or variable length. An object may comprise any grouping of data units, such as a file, object, database, etc.

Figure 6:
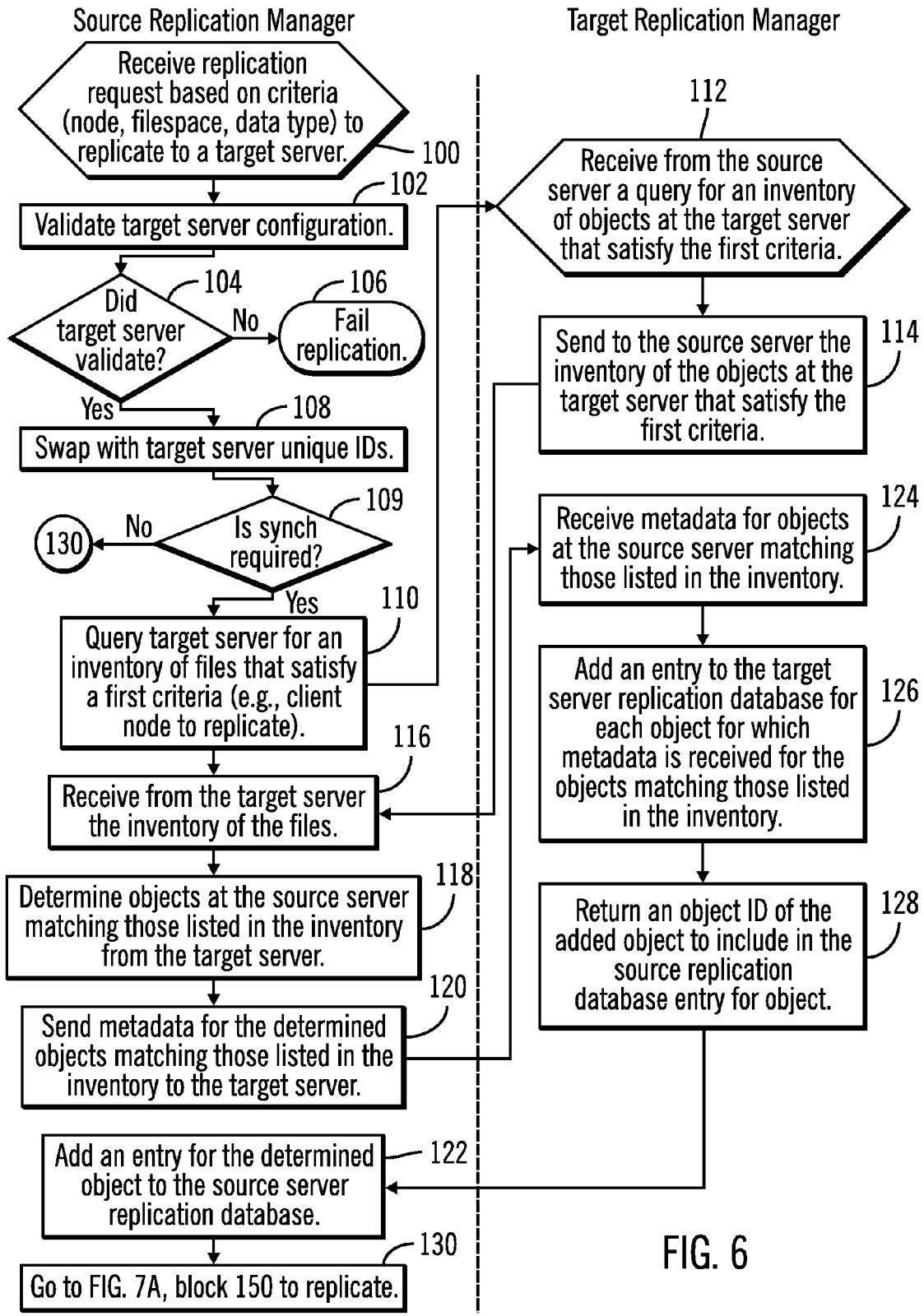
FIGS. 6, 7a, and 7b illustrate an embodiment of operations to process a replication request.

FIG. 6 illustrates an embodiment of operations performed by the source 6a and target 6b replication managers to replicate objects at the source server 4a to the target server 4b. Control begins with the source replication manager 6a receiving (at block 100) a replication request to replicate objects based on one or more criteria, such as the client node owning the object, filespace within client node including the object, and a data type of the object. In response to the request, the source replication manager 6a validates (at block 102) the target server 4b configuration to determine if the target server 4b supports replication. If (at block 104) the target server 4b was not validated, then the replication operation fails (at block 106). Otherwise, if the target server 4b is replication compatible, then the servers 4a, 4b swap (at block 108) unique identifiers if this is the first time that replication has occurred between the servers 4a, 4b. Servers 4a, 4b may maintain the server unique identifiers of a server available for replication in the replication databases 16a, 16b.

An administrator may request that synchronization be performed between the source 4a and target servers 4b to update the source 16a and target 16b replication databases to reflect that objects that have already been imported to the target server 4b are replicated, so that a redundant replication is not performed for those objects already at the target server 4b. If (at block 109) synchronization is required, then control proceeds to block 110 to synchronize, else, if synchronization is not requested or required, then control proceeds (at block 130) to FIG. 7a to perform replication.

If (at block 109) synchronization is required, then the source replication manager 6a queries (at block 110) the target server 4b for the target inventory 34 of files at the target server 4b that satisfy a first criteria (e.g., client node to replicate). Upon receiving (at block 112) the query, the target replication manager 6b sends (at block 114) to the source server 4a the inventory 34 of the objects at the target server 4b that satisfy the first criteria. In response to receiving (at block 116) the target inventory 34 of files, the source replication manager 6a determines (at block 118) objects at the source server 4a matching those listed in the target inventory 34 from the target server 4b. A unique attribute 64 (FIG. 3) of the objects at the source 4a and target 4b servers may be compared to determine if the target 4b has objects matching those at the source 4a, such as a signature, unique file name, hash value, etc.

The source replication manager 6a sends (at block 120) metadata for the determined objects matching those listed in the inventory 36 to the target server 4b. The source replication manager 6a adds (at block 122) an entry 60 (FIG. 3) to the source replication database 16a for the determined objects including the information the source replication manager 6a has available.

In response to receiving (at block 124) the metadata, the target replication manager 6b adds (at block 126) an entry 60 to the target server replication database 16b for each object for which metadata is received for the objects matching those listed in the inventory 36. In this way, those objects the target server 4b already has do not need to be transferred as part of replication, and synchronization updates the target replication database 16b to reflect those objects as replicated. The target replication manager 6b returns (at block 128) an object ID of the added object to the source replication manager 6a to include in the replicated object ID 70 in the entry 60 for the object in the source replication database 16a. The target replication manager 6b may also return the replication server node ID 76 and replication server filespace ID 78 to the replication manager 6a to include in entry for the object in the source server replication database 16a.

Figure 7A:
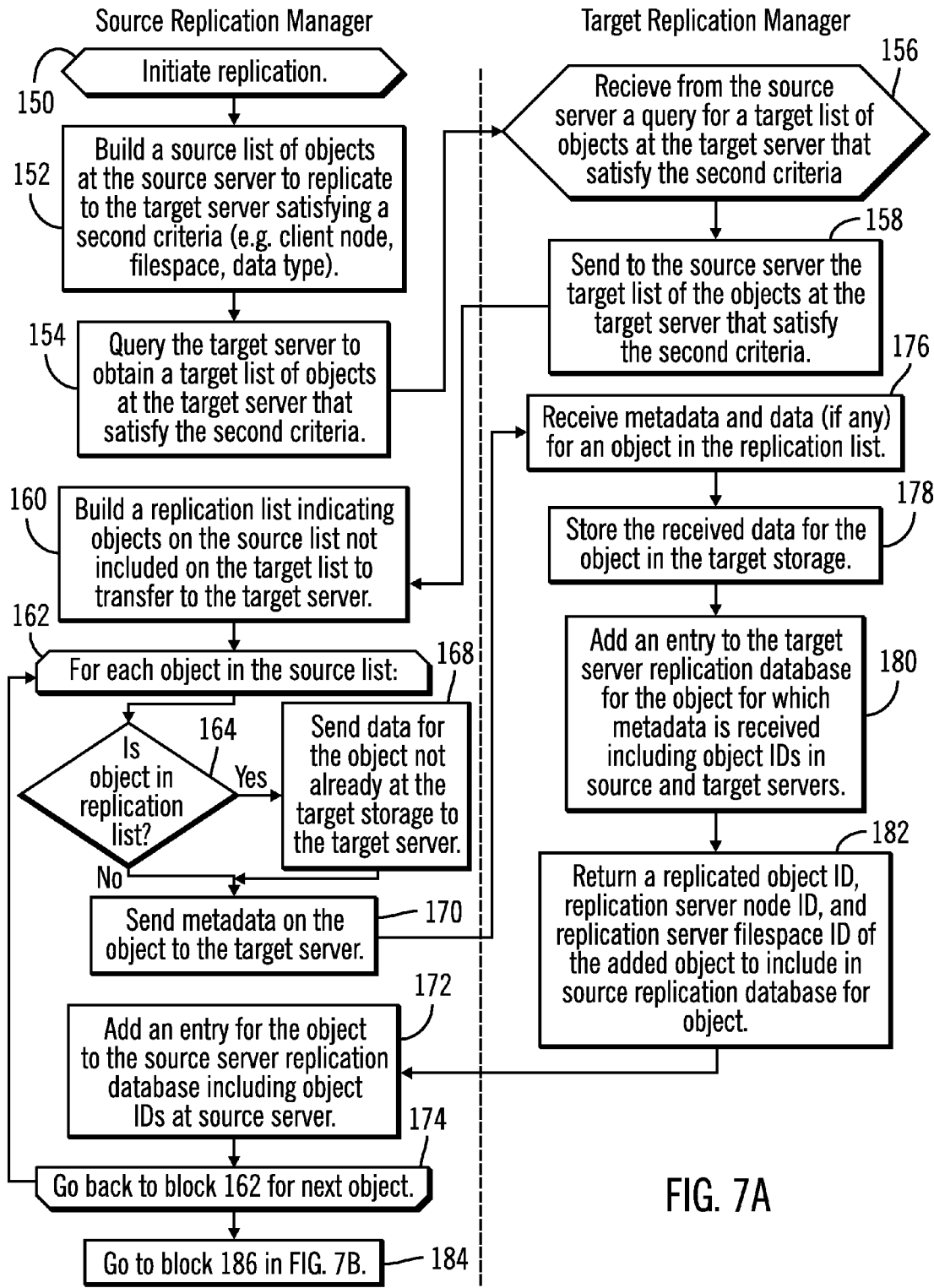

After performing the operations to add entries to synchronize the source 16a and target 16b replication databases to include entries for all objects satisfying a certain criteria that are already on both the source 4a and target 4b servers, control proceeds (at block 130) to block 150 in FIG. 7a to begin replication. The synchronization operations of FIG. 6 allow customers to synchronize the replication databases 16a, 16b to make objects existing on the target server 4b that have matching objects on the source server 4a appear as if they were replicated.

Figure 7B:
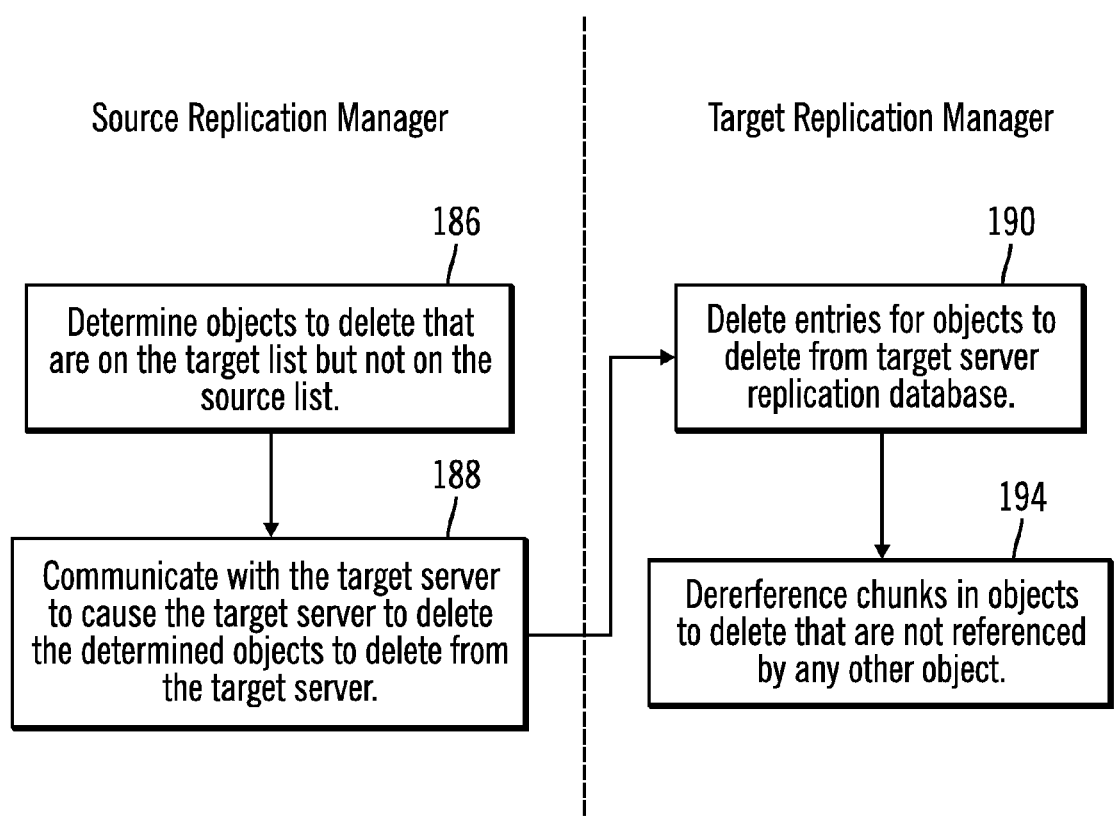

FIGS. 7a and 7b illustrate an embodiment of operations performed by the source 6a and target 6b replication managers to perform the replication operation. Upon initiating (at block 150) replication, the source replication manager 6a builds (at block 152) a source list 30 of objects at the source server 4a to replicate to the target server 4b satisfying a replication criteria (e.g. client node, filespace, data type), where the replication criteria used to determine files to replicate may be broader than the criteria used to determine the target inventory 34 (e.g., client node alone) at the target sever 4b. The source replication manager 6a queries (at block 154) the target server 4b to obtain the target list 32 of objects at the target server 4b that satisfy the second criteria. In response to the query, the target replication manager 6b sends (at block 158) to the source server 4a the target list 32 of the objects at the target server 4b that satisfy the replication criteria. Upon receiving the target list 32, the source replication manager 6a builds (at block 160) a replication list 36 indicating objects on the source list 30 not included on the target list 32 to transfer to the target server 4b.

For each object in the source list 30, the source replication manager 6a performs (at block 162 through 174) the operations at blocks 164 through 172 to replicate the object to the target server 4b. The loop at blocks 162 through 174 may end and proceed to block 184 after processing all objects in the source list 30, or may end upon occurrence of some other condition. If (at block 164) the object is on the replication list 36, then the source replication manager 6a sends data for the object to the target replication manager 6b. In one embodiment, the source replication manager 6a may only send data or chunks 12a for the object that are not already in the target storage 8b. Alternatively, the source replication manager 6a may send the entire object regardless of whether the target storage 8b has chunks 12b matching chunks in the object being replicated. After sending the data for the object to replicate (from block 168) or if the object is not on the replication list 36, indicating that the target server 4b already has the object, then the source replication manager 6a sends (at block 170) metadata on the object to the target server 4b, such as the information in the entry 60 (FIG. 3). The source replication manager 6a adds (at block 172) an entry 60 to the source replication database 16a for the object including the information in the fields shown in FIG. 3.

Upon receiving (at block 176) the metadata and data (if any data is sent at block 168 for an object in the replication list 36), the target replication manager 6a stores (at block 178) any received data for the object in the target storage 8a (data may not be received if the target storage 8b already has chunks 12b for the object) and adds (at block 180) an entry 60 to the target server replication database 16b for the object for which metadata is received including IDs 62, 70, 72, 74, 76, and 78 in source 4a and target 4b servers and other information in entry 60 (FIG. 3). The target replication manager 6b may further return (at block 182) a replicated object ID 70, replication server node ID 76, and replication server filespace ID 78 of the added object at the target server 4b to the source server 4a to include in the entry for the object in the source replication database 16a.

After adding entries to the source 16a and target 16b replication databases for all the objects to replicate, control proceeds (at block 184) to block 186 in FIG. 7b where the source replication manager 6a determines (at block 186) objects to delete that are on the target list 32 but not on the source list 30, or objects at the target server 4b that are not part of the objects in the source server 4a subject to replication. The source replication manager 6a communicates (at block 188) with the target server 4b to cause the target server 4b to delete the determined objects to delete from the target server 4b. In response to the communication, the target replication manager 6b deletes (at block 190) entries for objects to delete from the target server replication database 16b. Any chunks 12b in deleted objects that are not referenced by any other object are dereferenced (at block 194). When deleting an object, the reference count 86 in the entries 82 (FIG. 4) for the chunks 12b in the object are decremented, and any chunks 82 having a reference count of zero are indicated as dereferenced and eligible for removal at some point.

Figure 8:
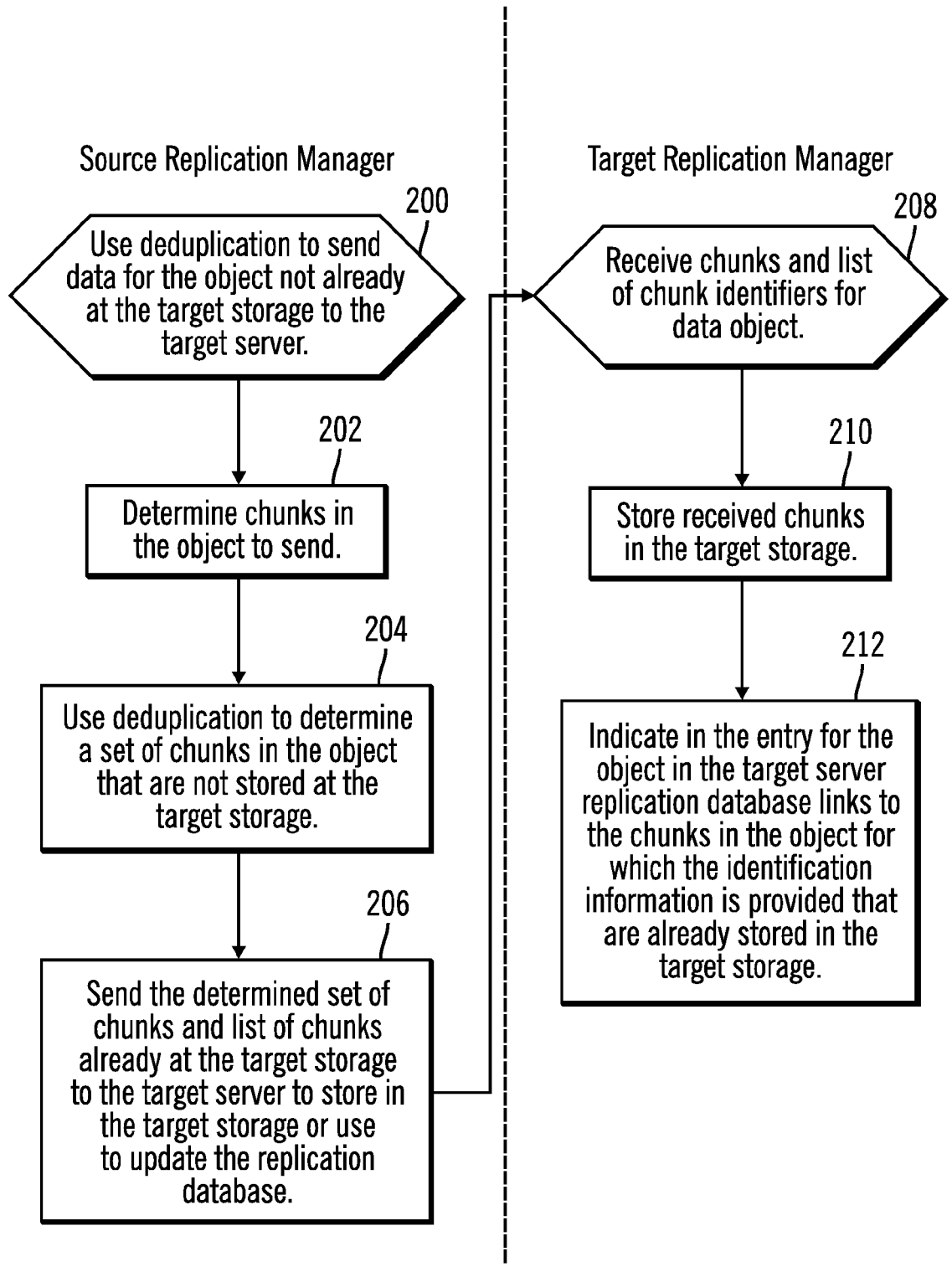
FIG. 8 illustrates an embodiment of operations to replicate objects using deduplication.

FIG. 8 illustrates an embodiment of operations performed by the source 6a and target 6b replication managers to replicate objects using deduplication. The operations of FIG. 8 are performed when the source replication manager 6a sends data for the object to the target server 4b at block 168 in FIG. 7a. Upon sending the object, the source replication manager 6a invokes the deduplication manager 26 to determine (at block 202) chunks in the object to send and then uses deduplication (at block 204) to determine a set of chunks 12a in the object that are not stored in the target storage 8b. The deduplication manager 26 may use the chunk index 28 to make this determination. The deduplication manager 26 or source replication manager 6a sends (at block 206) the determined set of chunks to the target server 4b to store in the target storage 8b and sends a list of chunk identifiers, such as the digest ($d_i$) and length ($l_i$), of chunks 12a in the object already in the target storage 8b. Upon receiving (at block 208) the chunks for the data object, the target replication manager 6b stores (at block 210) the received chunks in the target storage 8b. The target replication manager 6b indicates (at block 212) in the entry 60 for the object in the target server replication database 16b links to the chunks in the object for which the identification information, e.g., digest ($d_i$) and length ($l_i$), is provided that are already stored in the target storage and links to chunks added to the target storage 8b.

In described embodiments, the source replication manager 6a may encrypt data being transmitted to the target server 4b that is decrypted at the target server 4b. Further, object level replication allows the administrator/user to specify what data objects to replicate, and to provide for an incremental replication of only those chunks of objects to replicate that are not already stored at the target server 4b and storage 8b.

In certain embodiments, separate hardware and operating systems are provided at the source 4a and target 4b servers to allow for hardware and operating system independence. Further, the source 4a and target 4b servers may be implemented with heterogeneous hardware and operating systems.

In certain embodiments, the replication target server 4b may provide a hot standby at a remote location with respect to the source server 4a. If the source server 4a fails, client operations such as backup and restore can be redirected to the target server 4b, which is already operational for replication.

In further embodiments, multiple source servers 4a (e.g., at remote offices) can be replicated to a single target server 4b (e.g., at a central data center).

Further embodiments may provide logical groupings of different sets of objects, such that incomplete groups of objects on the target server 4b are not visible to the client node until the group is complete. Partial groups are maintained on the target server 4b to prevent the resending of objects. For instance, objects forming a logical group may be sent to the target server 4b during replication. In certain situations, some of the objects in the group might not be sent because of an error or the process being cancelled. In this situation, objects that were replicated remain at the target server and the target server marks the group not having all objects as incomplete. These incomplete groups are not made available to the client node during restore. At a later time, after replication has transferred the missing files, the group is marked completed and made available to the client node.

With the described embodiments, the replication between the source and target seeks to minimize the amount of data transmitted for objects sent to the target server by doing a check at the object level of objects already at the target server 4b and then when sending an object doing deduplication to avoid sending chunks for a data object already available at the target server 4b. Further, with described embodiments, the source replication manager 16a sends to the target replication manager 16b metadata on objects to replicate that are already stored at the target server 4b to cause the target replication manager 6b to add an entry to the target replication database 16b for the object to replicate already at the target server 4b.

CLOUD COMPUTING EMBODIMENTS

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 9-1. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
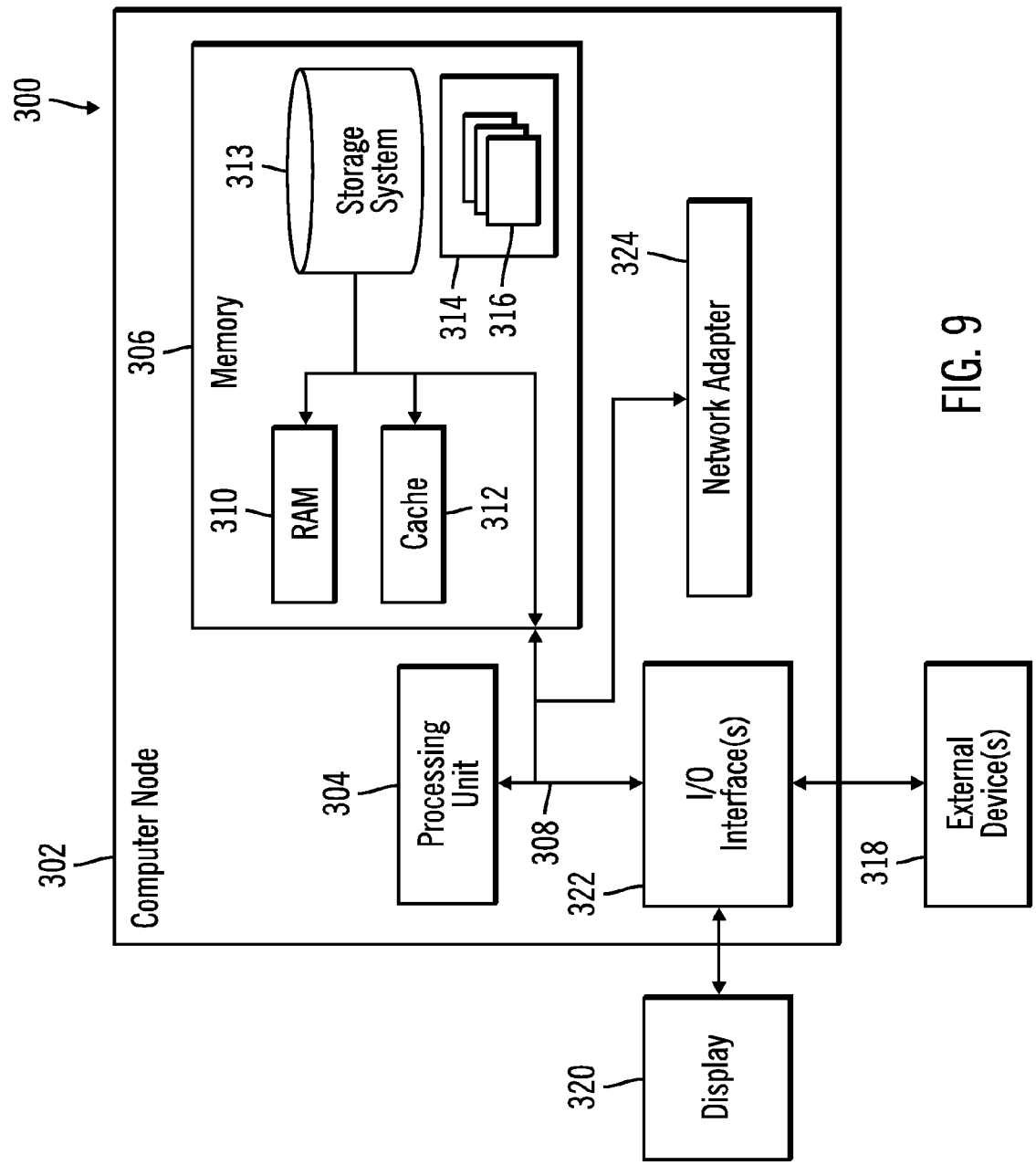
FIG. 9 illustrates an implementation of a node in the network computing embodiment.

FIG. 9 illustrates an embodiment of a cloud computing node 300 which may comprise an implementation of the source server 4a, target server 4b, and deduplication 24 components, where the components may be implemented in one or more of the nodes 300. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 10:
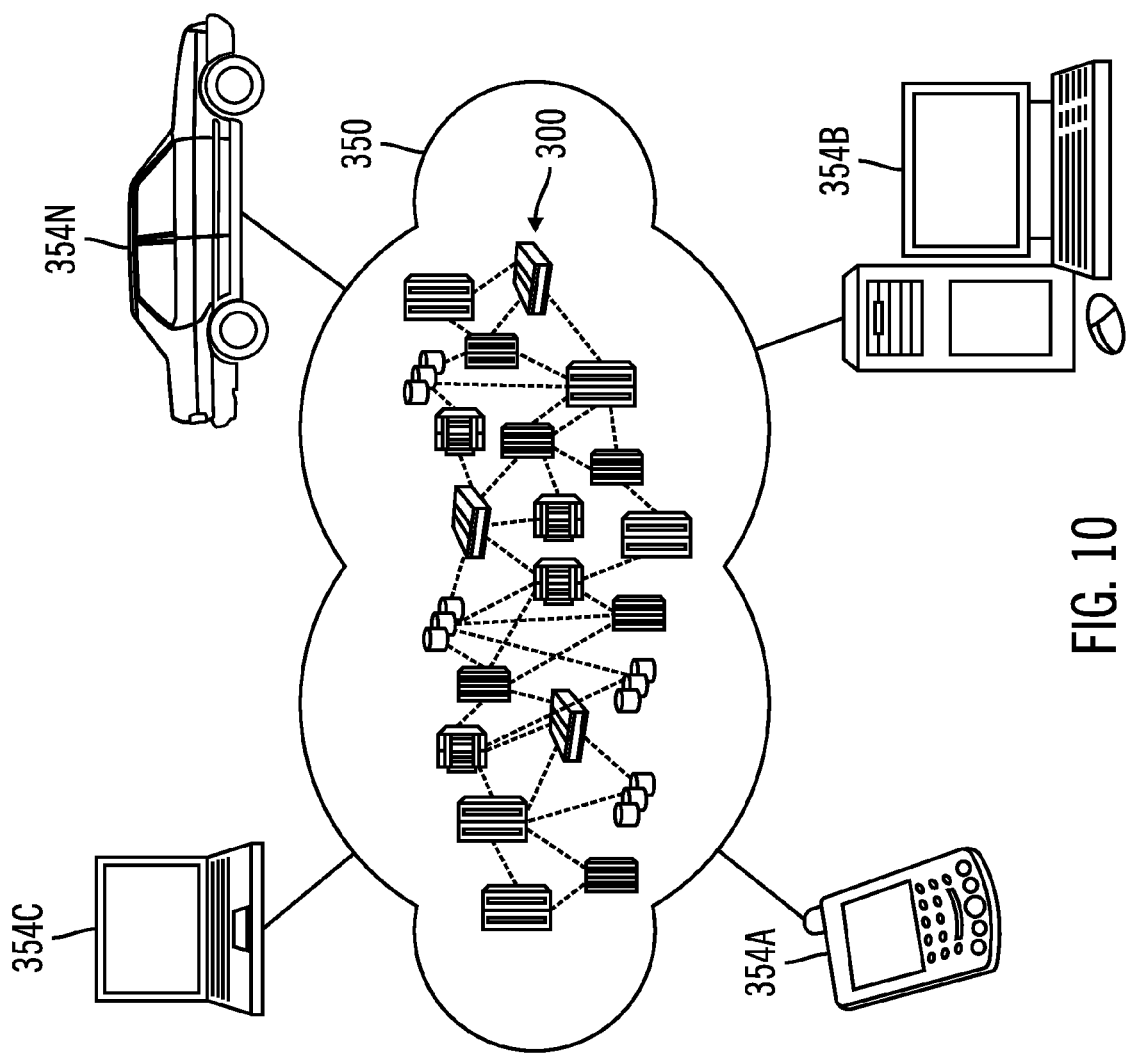
FIG. 10 illustrates an embodiment of a cloud computing environment.

Referring now to FIG. 10, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 10 are intended to be illustrative only and that computing nodes 300 and cloud computing environment 350 can communicate with any type of computerized device over any type of network and/or network addressable connection (e.g., using a web browser).

Further, FIG. 10 shows a single cloud. However, certain cloud embodiments may provide a deployment model including a separate "Backup" or "Data Protection" cloud, in addition to the cloud having the customer/production data. Providing a separate and distinct additional cloud as the data protection cloud in order to separate whatever primary cloud model (provide, community, hybrid, etc) from the data protection cloud prevents a single point of failure and provides a greater degree of protection of the customer data in the separate backup cloud.

Figure 11:
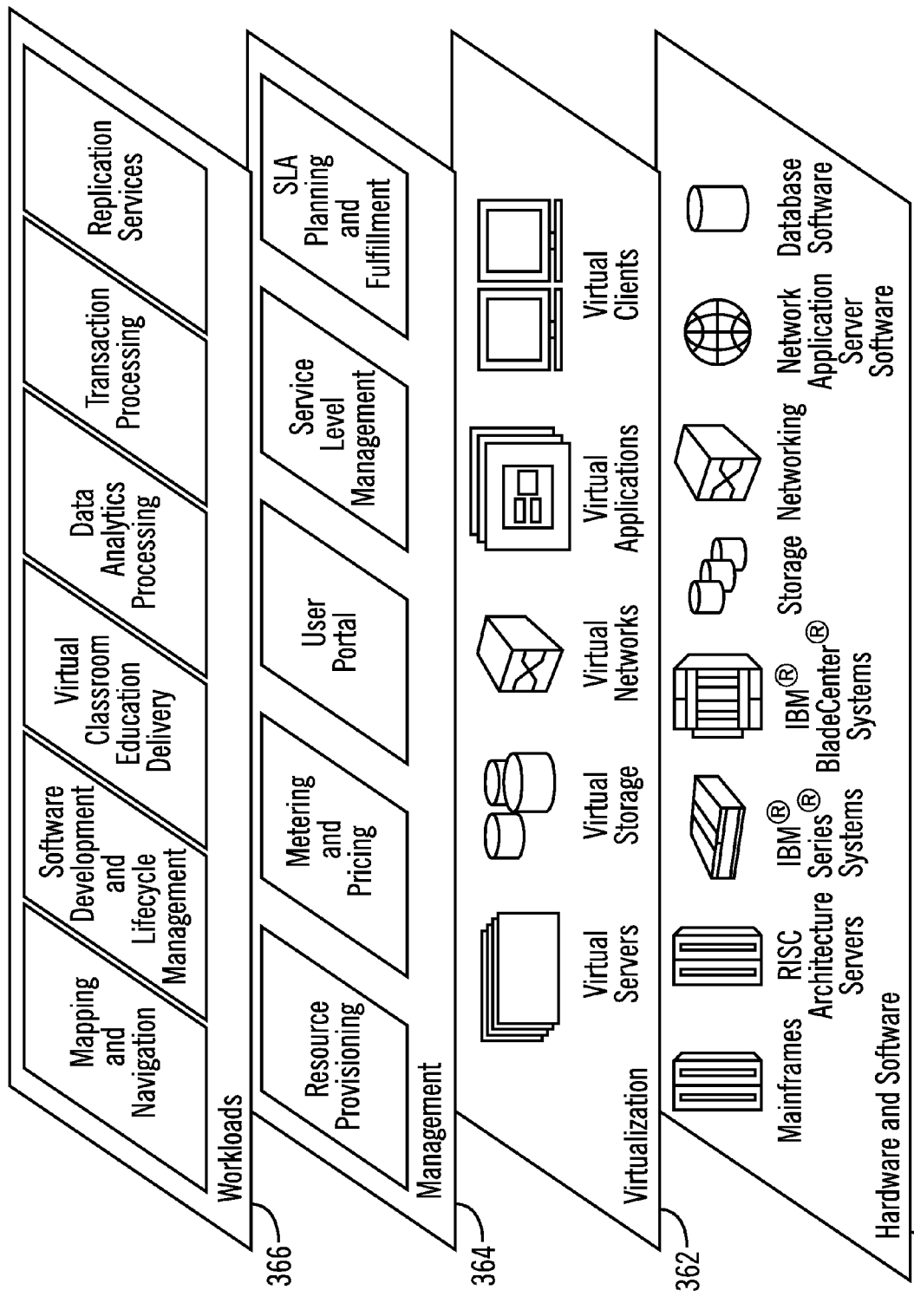
FIG. 11 illustrates an embodiment of abstraction model layers of a cloud computing environment.

Referring now to FIG. 11, a set of functional abstraction layers provided by cloud computing environment 350 (FIG. 12) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the replication services, such as described with respect to FIGS. 1-8, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 7*a*, 7*b*, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for replicating objects from a source storage managed by a source server to a target storage managed by a target server, comprising:

building a source list of objects at the source server to replicate to the target server as part of a replication request, wherein each of the objects is comprised of chunks;

querying the target server to obtain a target list of objects at the target server satisfying a replication criteria of the replication request, wherein the replication criteria allows for selection and filtering of objects to replicate at an object level;

building a replication list indicating objects on the source list not included on the target list to transfer to the target server;

for each object in the replication list, performing:
   determining chunks in the object;
   determining a first set of the chunks in the object that are not stored at the target storage;
   sending the first set of the chunks in the object not already at the target storage to the target server;
   sending metadata on the object, in the replication list, to the target server to cause the target server to include the metadata in an entry for the object, in the replication list, in a target server replication database;
   adding an entry having information for the object being replicated to a source server replication database;
   determining a second set of chunks in the object that are currently stored at the target storage; and
   sending chunk identifiers of chunks in the second set of chunks to the target server; and sending metadata to the target server for objects at the source server matching objects at the target server in the target list and that are not in the replication list.

2. The method of claim 1, further comprising:
for each object on both the source list and the target list, performing:
sending metadata for the object to the target server to cause the target server to include the metadata in an entry for the object in the target server replication database; and
adding an entry having information for the object being replicated to the source server replication database.

3. The method of claim 1, wherein the replication criteria comprises a second criteria, further comprising:
querying the target server for an inventory of objects at the target server that satisfy a first criteria;
receiving from the target server the inventory;
determining objects in the source server matching those listed in the inventory from the target server;
wherein the sent metadata is for the determined objects matching those listed in the inventory to the target server to cause the target server to include the metadata in an entry for the object in the target server replication database; and
adding an entry having information for the object being replicated to the source server replication database, wherein the source list includes objects to replicate at the source server that satisfy the second criteria.

4. The method of claim 3, wherein the first criteria comprises a client node originating the objects to replicate and wherein the second criteria comprises at least one of data type and filespace of objects at the client node.

5. The method of claim 1, further comprising:
determining objects to delete that are on the target list but not on the source list; and
communicating with the target server to cause the target server to delete the determined objects to delete from the target server and target storage.

6. The method of claim 1, further comprising:
for each object in the replication list, including in the entry for the object in the source server replication database an identifier of the object at the source storage and an identifier of the object at the target server.

7. The method of claim 1, wherein the source and target servers provide for at least one: of separate and independently operating hardware and operating systems; having the target server provide a hot standby mode for the source server; and heterogeneous hardware and operating systems.

8. A method for replicating objects from a source storage managed by a source server to a target storage managed by a target server, comprising:
receiving a query from the source server for a target list of objects at the target server satisfying a replication criteria of a replication request, wherein the replication criteria allows for selection and filtering of objects to replicate at an object level, wherein each of the objects is comprised of chunks;
sending the source server the target list of the objects at the target server satisfying the replication criteria;
receiving, from the source server, only those chunks for at least one object from the source server that are not already stored in the target storage to store in the target storage;
receiving, from the source server, metadata for the objects to replicate not included in the target list;
receiving, from the source server, a list of chunks in at least one object currently stored in the target storage;
for each object for which less than all chunks in the object were received from the target server, indicating, in an entry for the object in a target server replication database, links to the chunks in the list of chunks already stored in the target storage;
adding an entry to the target server replication database for each object for which data is received including the metadata received for the object; and
receiving, from the source server, metadata for objects at the source server matching objects at the target server in the target list.

9. The method of claim 8, further comprising:
for each object to replicate already stored in the target storage including the received metadata for the object, adding an entry having information for the object to the target server replication database.

10. The method of claim 8, further comprising:
receiving from the source server a query for an inventory of objects at the target server that satisfy a first criteria;
sending to the source server the inventory;
wherein the received metadata is for objects at the source server matching those listed in the inventory; and
adding an entry to the target server replication database for each object for which metadata is received for the objects matching those listed in the inventory, wherein the entries include the metadata for the object, wherein the target list includes objects at the target server that satisfy a second criteria.

11. The method of claim 8, further comprising:
maintaining a group of objects stored in the target storage; and
indicating the group of objects as incomplete in response to determining that not all the objects in the group have been received at the target storage, wherein the group of objects indicated as incomplete are not made available to a client node during a restore operation.

12. The method of claim 11, further comprising:
receiving objects for the group of objects indicated as incomplete; and
indicating the group of objects as complete in response to having received all the objects in the group, wherein objects in the group indicated as complete are available to the client node during a restore operation.

13. The method of claim 8, further comprising:
for the entry for each object in the target server replication database, including an identifier of the object at the source server and an identifier of the object at the target storage.

14. The method of claim 8, wherein multiple source servers are replicated to the target storage.

* * * * *